Patented Jan. 15, 1952

2,582,253

UNITED STATES PATENT OFFICE 2,582,253

SYNTHETIC ESTROGENS

John A. Hogg and Alan H. Nathan, Kalamazoo, Mich., assignors to The Upjohn Company, Kalamazoo, Mich., a corporation of Michigan No Drawing. Application September 26, 1949, Serial No. 117,949

3 Claims. (Cl. 260—520)

The present invention relates to novel synthetic estrogens, 2 - methyl - 3 - ethyl-4-(para-anisyl) - $\Delta^3$- and -$\Delta^4$ - cyclohexenecarboxylic acids, and alkali-metal salts thereof.

The compounds of the present invention have the formula:

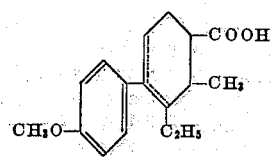

wherein a double bond is present in either the 3 or 4 position of the cyclohexane nucleus.

The compounds of the invention are highly-active estrogens, producing the full estrus response in rats at dose levels of only about 0.045 gamma, determined by the Kahnt-Doisy method, as compared with estrone, which produces the full estrus response in rats at a dose level of 1.0 gamma. This high degree of activity is most unexpected, especially since the compounds lack the angular methyl group which is ordinarily present in compounds exhibiting high estrogenic activity and which is usually associated with such activity. What is still more surprising is that these compounds appear to be about twice as active, both subcutaneously and orally, as corresponding angularly methylated (at C-1) compounds of similar structure (such as compound (XI) herein).

It is an object of the present invention to provide novel estrogenic compounds, having an unusually high estrogenic activity. A further object of the invention is the provision of the novel compounds 2-methyl-3-ethyl - 4 - (para-anisyl) - $\Delta^3$-cyclohexenecarboxylic acid and 2-methyl-3-ethyl-4-(para-anisyl) - $\Delta^4$ - cyclohexenecarboxylic acid, and alkali-metal salts thereof. Other objects of the invention will become apparent hereinafter.

The compounds are prepared according to the following sequence of reactions, which is illustrated graphically for purposes of clarity:

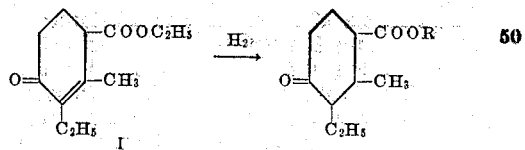

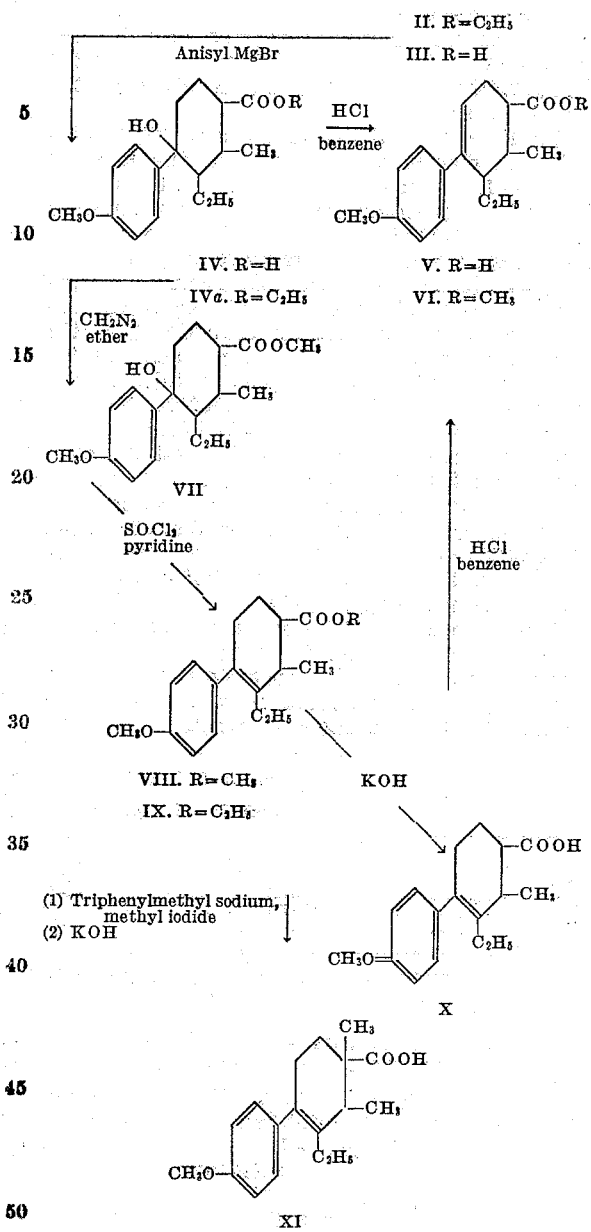

The compounds are prepared by the alkylation of Hagemann's ester [Hagemann, Berichte 26, 876 (1893)], 3-methyl-4-carbethoxycyclohexene-2-one-1, with ethyl iodide or ethyl bromide according to the method of Smith and Rouault, J. Am. Chem. Soc. 65, 631 (1943) in the presence of sodium ethoxide to produce high yields (55 percent) of (I). The use of potassium in tertiary butanol raises the yield of (I) to 80 percent. Compound (I) 2-ethyl-3-methyl-4-carbethoxycyclohexene-2-one-1, rapidly absorbs one molar equivalent of hydrogen in the presence of palladium at room temperature and two or three atmospheres of pressure, yielding 2-ethyl-3-methyl-4-carbethoxycyclohexanone-1 (II). This ester can be hydrolyzed to the free acid (III), which may then be reacted with a Grignard reagent, para-anisylmagnesium bromide, to produce the hydroxy acid (IV). If the ester (II) is employed in the Grignard reaction, hydrolysis of the resulting ester (IVa) after decomposition of the magnesium salt, is also productive of the hydroxy acid (IV). This acid (IV) may be converted to 2-methyl-3-ethyl-4-(para-anisyl)-$\Delta^4$-cyclohexenecarboxylic acid (V) by dehydration with a benzene solution saturated with dry hydrogen chloride. The acid (V) may be converted to its methyl ester (VI) by means of diazomethane in ether.

Treatment of the hydroxy acid (IV) with ethereal diazomethane results in the hydroxy ester (VII), which, upon treatment with thionyl chloride in pyridine [Darzens, Comptes rendus 152, 1601 (1911)], is dehydrated to the unsaturated ester (VIII), which is converted to the corresponding acid (X), 2-methyl-3-ethyl-4-(para-anisyl)-$\Delta^3$-cyclohexenecarboxylic acid, by hydrolysis. Upon treatment of compound (X) with dry hydrogen chloride in benzene, compound (V) is formed, and when produced in this manner does not depress the melting point of (V) produced from (IV). Treatment of (VIII) with triphenylmethylsodium followed by methyl iodide, and saponification of the ester group, is productive of compound (XI), 1,2-dimethyl-3-ethyl-4-(para-anisyl) - $\Delta^3$ - cyclohexenecarboxylic acid. Ester (IX) of the acid (X) is produced by refluxing (X) with absolute ethyl alcohol and a catalytic amount of sulfuric acid.

The estrogenic activity of certain of the compounds was determined by the Kahnt-Doisy method, and that of compounds (V) and (X) found to be of an unusually high order. The following table illustrates the results.

| Compound | Melting point, degrees centigrade | Activity (Rat units in gammas) |
|---|---|---|
| IV | 181–182 (dec.) | 36.1 |
| X | 181–182.5 | 0.048 |
| V | 156–157 | 0.045 |
| XI | 173–174 | 0.108 |
| Estrone | | 1.0 |

The following examples are illustrative only and are not to be construed as limiting.

PREPARATION 1.—2-ETHYL-3-METHYL-4-CARBETHOXYCYCLOHEXENE-2-ONE-1 (I)

To a solution of 7.8 grams (0.2 gram-atom) of potassium in 160 milliliters of sodium-dried tertiary butanol were added 36.4 grams (0.2 mole) of 3-methyl-4-carbethoxycyclohexene-2-one-1 and 22 grams of ethyl bromide. The mixture was boiled gently under reflux, with continual stirring, for three hours. Most of the solvents were removed by distillation, and the residue was worked up as described by Smith and Rouault, J. Am. Chem. Soc. 65, 631 (1943). The product was collected at 149–154 degrees centigrade at thirteen millimeters of mercury pressure; $n_D^{26}$ 1.4854. The yield was 35.0 grams (83.5 percent of theory.) Ethyl iodide was used for the alkylation with equally satisfactory results.

PREPARATION 2.—2-ETHYL-3-METHYL-4-CARBETHOXYCYCLOHEXANONE-1 (II)

Hydrogenation of the unsaturated ester (I) in two volumes of 95 percent alcohol with five percent of its weight of palladinized charcoal [Hartung, J. Am. Chem. Soc. 66, 888 (1944)] at 2.5 atmospheres of pressure resulted in rapid, exothermic absorption of one molecular equivalent of hydrogen. The catalyst was removed, and the product distilled and found to have a boiling point of 140–150 degrees centigrade at thirteen millimeters of mercury pressure; $n_D^{26}$ 1.462. The yield was 96 percent of theory. A semicarbazone, prepared from this compound in the usual manner, melted at 188–188.5 degrees centigrade after one recrystallization from 95 percent alcohol and gave the following analysis:

Analysis—
  Calculated for $C_{13}H_{23}N_3O_3$: C, 58.0  H, 8.62  N, 15.62
  Found:                            58.4     8.84    15.75

PREPARATION 3.—2-ETHYL-3-METHYL-4-CARBOXYCYCLOHEXANONE-1 (III)

The above ester (II) from Preparation 2 was saponified by refluxing for one hour in a solution composed of four equivalents of potassium hydroxide in a mixture of seven milliliters of water and seven milliliters of 95 percent alcohol per gram of ester. The alcohol was removed under reduced pressure and the alkaline solution extracted with ether, about five percent of unsaponified ester being recovered. The solution was then acidified, extracted with ether, and the ether extracts dried and distilled. The acid (III) boiled at 122 degrees centigrade at 0.12 millimeter of mercury pressure. The yield was 76.5 percent of theory, based on ester actually used.

Analysis—
  Calculated for $C_{10}H_{16}O_3$: C, 65.3  H, 8.75
  Found:                           64.9     8.76

The ester (II) was saponified in a similar manner without first distilling, in which case the yield of acid (III), boiling at 131–135 degrees centigrade at 0.2 millimeter of mercury pressure, was 83.5 percent of the theoretical amount, based on the starting unsaturated ester (I).

PREPARATION 4.—THE GRIGNARD REACTION
(a) USE OF THE KETO-ESTER (II)

An ethereal solution of para-anisylmagnesium bromide, prepared from 19.65 grams (0.105 mole) of para-bromoanisole, was added slowly to an ice-cold ethereal solution containing 21.2 grams (0.1 mole) of 2-ethyl-3-methyl-4-carbethoxycyclohexanone-1 (II) with continual stirring, whereupon heat was evolved and a yellow complex separated. The mixture was warmed under reflux for one-half hour and then hydrolyzed with cold dilute sulfuric acid. The products were taken up in ether, washed, dried over potassium carbonate, and isolated by evaporating the ether. Distillation gave 2.30 grams of anisole and 10.5 grams of unchanged keto-ester. The residue, 13.1 grams, was a viscous oil containing a small quantity of white crystalline material, which was identified as bi-para-anisyl. The oil was saponified with alcoholic sodium hydroxide to give, after acidification, 1.94 grams (6.6 percent) of the acid (IV), which melted at 175.5–177.5 degrees centigrade with decomposition (effervescence). Upon standing without acidification, a precipitate of the alkali-metal salt (Na) of the unsaturated acid (X) is deposited. Several recrystallizations from dilute methanol raised the melting point of (IV) to 182.5–183 degrees centigrade (dec.). The analytical figures were in agreement with those calculated for the hydroxy acid (IV).

Analysis—
Calculated for $C_{17}H_{24}O_4$: C, 69.8; H, 8.28
Found: 70.1     8.13

The methyl ester (VII) of this acid, prepared by the action of diazomethane in ether or benzene, formed small, white, spherical aggregates of microcrystals, which melted at 118–120 degrees centigrade when recrystallized from petroleum ether.

Analysis—
Calculated for $C_{18}H_{26}O_4$: C, 70.6; H, 8.55
Found: 70.4     8.47

(b) USE OF THE KETO-ACID (III)

A solution of para-anisylmagnesium bromide, prepared from 44 grams of para-bromoanisole in fifty milliliters of tetrahydrofuran, was added with stirring and cooling to a solution of 18.4 grams of 2-ethyl-3-methyl-4-carboxycyclohexanone (III) in 200 milliliters of tetrahydrofuran, and the resulting solution then boiled under reflux. After one and one-half hours, a Gilman-Schulze test for unchanged Grignard reagent was negative. The magnesium salts were hydrolyzed with aqueous ammonium chloride and the products, after extraction with ether, were separated into a neutral and an acidic fraction by use of sodium carbonate solution. The neutral fraction (fourteen grams) consisted mainly of anisole. When the acidic fraction (23 grams), isolated by acidification of the sodium carbonate solution, was dissolved in 95 percent alcohol and allowed to stand in the refrigerator for ten days, it deposited 2.6 grams of small white crystals, melting point 183–185 degrees centigrade. These were shown to be the hydroxy-acid (IV) by conversion to the methyl ester (VII) with diazomethane.

Example 1.—Preparation of 2-methyl-3-ethyl-4-(para-anisyl)-$\Delta^3$-cyclohexenecarboxylic acid (X)

A solution of 200 milligrams of the methyl ester (VII) in 0.58 gram of pyridine was cooled in an ice-bath and treated with 0.10 gram of thionyl chloride. The mixture was then heated on the steam-bath for ten minutes, diluted with water, and acidified with dilute sulfuric acid. An oily product (VIII) separated and soon crystallized. The yield was 185 milligrams; melting point 60 degrees centigrade. Recrystallization from dilute methanol raised the melting point to a constant value of 78.5–79.5 degrees centigrade.

Analysis—
Calculated for $C_{18}H_{24}O_3$: C. 75.0; H, 8.39
Found: C, 74.5; H, 8.11

Saponification of the above ester (VIII) with alcoholic potassium hydroxide gave the potassium salt of the acid (X) which, after acidification and recrystallization from alcohol, gave the acid (X), melting at 181–182.5 degrees centigrade, which depressed the melting point of the starting hydroxy acid (IV) to 174–176 degrees centigrade, and gave the following analytical figures:

Analysis—
Calculated for $C_{17}H_{22}O_3$: C. 74.5; H, 8.09
Found: C. 74.7; H. 8.03

Upon allowing the alcoholic potassium hydroxide solution or sodium hydroxide solution, whichever is used for saponification, to stand, a precipitate of the alkali-metal salt of the acid (X) is deposited and may be collected.

Example 2.—Preparation of 2-methyl-3-ethyl-4-(para-anisyl)-$\Delta^4$-cyclohexenecarboxylic acid (V)

A Grignard reaction was carried out using one equivalent of the keto-acid (III) and two equivalents of para-anisyl-magnesium bromide, in the manner described above. After decomposing the magnesium salts with dilute sulfuric acid, the organic products were dissolved in benzene, filtered, and the benzene solution dried. The solution was then chilled in an ice-bath, saturated with dry hydrogen chloride, and allowed to stand at room temperature for four hours. The solvent was removed on the steam bath in a current of air, leaving a residue (V) which, upon recrystallization from alcohol, melted at 156–157 degrees centigrade. Further recrystallization did not raise the melting point.

Analysis—
Calculated for $C_{17}H_{22}O_3$: C. 74.5; H, 8.09
Found: C, 73.9; H, 7.83

When the pure unsaturated acid (X), melting at 181–182.5 degrees centigrade, was dissolved in benzene and treated with dry hydrogen chloride as described above, the product, isolated in practically quantitative yield, melted at 155–157 degrees centigrade, and gave no melting point depression when mixed with the acid isolated directly from the Grignard reaction described above. This product is the compound of Formula V. Acid (V), prepared in either manner, is readily converted to the alkali-metal salt, such as the sodium or potassium salt, by treatment with the appropriate alkali-metal hydroxide.

PREPARATION 4.—PREPARATION OF 1,2-DIMETHYL-3-ETHYL-4-(PARA-ANISYL)-$\Delta^3$-CYCLOHEXENECARBOXYLIC ACID (XI)

To a solution of 912 milligrams of the methyl ester (VIII), melting point 78.5–79.5 degrees centigrade, was added a slight excess of ethereal triphenylmethyl sodium [Hauser and Hudson, "Organic Reactions," I, 286, John Wiley and Sons, New York, N. Y. (1942)] in one portion, whereupon the red color faded rapidly. After thirty minutes, a large excess of methyl iodide was added, and the mixture allowed to stand overnight, whereafter 1.5 milliliters of glacial acetic acid was added, the ether solution washed with water and sodium carbonate solution, dried, and evaporated. The residue was saponified by refluxing for twenty-two hours with two milliliters of 42 percent potassium hydroxide solution in thirty milliliters of alcohol. The alkaline solution was diluted with water, extracted with ether, treated with a stream of carbon dioxide, and filtered. The filtrate was acidified with hydrochloric acid. A snow-white crystalline precipitate of (XI) formed in a yield of 730 milligrams (80 percent); melting point 158–160 degrees centigrade. After two recrystallizations from methanol, the compound (XI) melted at 173–173.5 degrees centigrade and depressed the melting point of the acid (X) to below 155 degrees centigrade.

Analysis—
Calculated for $C_{18}H_{24}O_3$: C, 75.0; H, 8.39
Found: C, 74.7; H. 8.21

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of 2-methyl-3-ethyl-4-(para-anisyl)-$\Delta^3$-cyclohexenecarboxylic acid, and 2 - methyl - 3 - ethyl - 4 - (para-anisyl)-$\Delta^4$-cyclohexencarboxylic acid, and alkali-metal salts thereof.

2. 2 - Methyl - 3 - ethyl - 4-(para-anisyl)-$\Delta^3$-cyclohexenecarboxylic acid.

3. 2 - Methyl - 3 - ethyl - 4-(para-anisyl)-$\Delta^4$-cyclohexenecarboxylic acid.

JOHN A. HOGG.
ALAN H. NATHAN.

REFERENCES CITED

The following references are of record in the file of this patent:

UNITED STATES PATENTS

| Number | Name | Date |
|---|---|---|
| 2,496,064 | Natelson et al. | Jan. 31, 1950 |

OTHER REFERENCES

Rubin et al.: J. Am. Chem. Soc., vol. 68, pages 338–340 (1946).